(12) United States Patent
Janik

(10) Patent No.: US 9,685,867 B2
(45) Date of Patent: Jun. 20, 2017

(54) ELECTRICAL POWER SUPPLY (71) Applicant: STMicroelectronics International N.V., Schiphol (NL)

(72) Inventor: Bohumil Janik, Cesky Brod (CZ)

(73) Assignee: STMicroelectronics International N.V., Schiphol (NL)

( * ) Notice: Subject to any disclaimer, the term of this patent is extended or adjusted under 35 U.S.C. 154(b) by 351 days.

(21) Appl. No.: 14/466,666

(22) Filed: Aug. 22, 2014

(65) Prior Publication Data
US 2016/0056713 A1  Feb. 25, 2016

(51) Int. Cl.
*H02M 3/158* (2006.01)

(52) U.S. Cl.
CPC .................. *H02M 3/1582* (2013.01)

(58) Field of Classification Search
CPC .... H02M 3/155–3/158; H02M 3/1582; H02M 3/1584; H02M 3/1588; H02M 3/33507
USPC .................. 323/259, 271, 282–287
See application file for complete search history.

(56) References Cited

U.S. PATENT DOCUMENTS

| | | |
|---|---|---|
| 5,075,599 A | 12/1991 | Overgoor et al. |
| 5,742,134 A | 4/1998 | Wacyk et al. |
| 6,002,214 A | 12/1999 | Ribarich |
| 6,121,731 A | 9/2000 | Kanazawa et al. |
| 8,912,769 B2 * | 12/2014 | Lin ............ H02M 3/1582 323/224 |
| 2005/0285579 A1 * | 12/2005 | Yasukouchi ........ H02M 3/1588 323/282 |
| 2008/0278136 A1 * | 11/2008 | Murtojarvi ........ H02M 3/1584 323/299 |
| 2010/0164449 A1 * | 7/2010 | Dwarakanath ...... H02M 3/1582 323/282 |
| 2011/0234187 A1 * | 9/2011 | Brown ............ H02M 3/1588 323/282 |
| 2013/0193941 A1 * | 8/2013 | DeFazio .......... G05F 1/46 323/282 |
| 2016/0049860 A1 * | 2/2016 | Ihs ............ H02M 3/158 323/282 |

* cited by examiner

*Primary Examiner* — Jue Zhang
*Assistant Examiner* — Kevin H Sprenger
(74) *Attorney, Agent, or Firm* — Seed IP Law Group LLP (57) ABSTRACT

A method supplies power from a power source to a load. The method includes, in a first mode, electrically coupling a step-down converter node of a step-down converter alternately to the power source via a conductive bypass path that bypasses a step-up converter and to ground. The step-up converter has an input electrically coupled to the power source and the step-down converter has an output electrically coupled to the load. The method further includes, in a second mode, coupling the step-down converter node alternately to the power source via the bypass path and to an output of the step-up converter.

29 Claims, 6 Drawing Sheets

ELECTRICAL POWER SUPPLY

BACKGROUND

Technical Field

The disclosure relates to an electrical power supply circuit and to a method of supplying electrical power. The disclosure has particular utility to applications in which a source voltage is stepped up/down to provide an output voltage higher/lower than the source voltage.

Background Description of the Related Art

Some components of battery powered devices use voltages higher than a maximum voltage that can be supplied by the battery. For example, mobile communication devices typically have lithium ion batteries able to supply a maximum voltage between 4.2V and 3V or down to 2.5V for a low cut-off one. As the battery is drained, the maximum voltage it is able to supply decreases, meaning that the supply voltage can often decrease to 2.5V. One component that uses a higher supply voltage is a radio frequency (RF) power amplifier (PA), which uses approximately 3.4V in a Global System for Mobile Communications (GSM) mobile communication device, and as much as 4.5V when Multi Mode Multi Band (MMMB) is employed.

In order to deal with this, many mobile communication devices incorporate a step-up converter. However, step-up converters have some principal drawbacks that limit their ability to supply an RF PA directly, the main one of which is that their output has high ripple, which can cause degradation of the RF signal in the RF PA due to an unwanted inter-modulation. Another disadvantage of step-up converters is the low bandwidth of their control loop, which is a limiting factor in terms of envelope tracking technique use.

In some devices, a cascade of a step-up converter and a step-down converter is provided. The RF PA is supplied by the step-down converter, which has a low ripple and a high speed regulation loop. The step-up converter generates a boosted battery voltage to supply the step-down converter. Unfortunately, if the step-down converter is always supplied by the step-up converter, there can be inefficiency due to losses in the step-up converter, particularly when the battery voltage would be sufficiently high without boosting. It has therefore been proposed to switch between the battery supplying the step-down converter directly and the step-down converter being supplied by the step-up converter. This offers an improvement, but the switching cannot be carried out during operation of the RF PA, as it can cause a large jump in the output voltage of the step-down converter. The right supply for the step-down converter can be selected in advance, before operation of the RF PA starts. However, this requires knowledge of the likely battery voltage and expected maximum output voltage, which is not straightforward and generally requires information from a digital RF control chip.

BRIEF SUMMARY

Embodiments of the disclosure are described below, with reference to the accompanying drawings, by way of example only.

One embodiment of the present disclosure is an electrical power supply circuit for delivering power from a power source to a load. The electrical power supply circuit includes an power input node coupleable to the power source; a step-up converter having an input coupled to the power input node; a step-down converter having a step-down converter node and an output coupleable to the load; a conductive bypass path; a switching stage; and a controller configured to control the switching stage. The switching stage includes: a first switch configured to selectively couple the step-down converter node of the step-down converter to the input of the step-up converter via the bypass path that bypasses the step-up converter; a second switch configured to selectively couple an output of the step-up converter to the step-down converter node of the step-down converter; and a third switch configured to selectively couple the step-down converter node of the step-down converter to a ground. The controller is configured to, in a first mode, open the second switch and, alternatingly close the first switch and open the third switch; and open the first switch and close the third switch. The controller is also configured to, in a second mode, open the third switch and, alternatingly close the first switch and open the second switch; and open the first switch and close the second switch.

DETAILED DESCRIPTION

Figure 1:
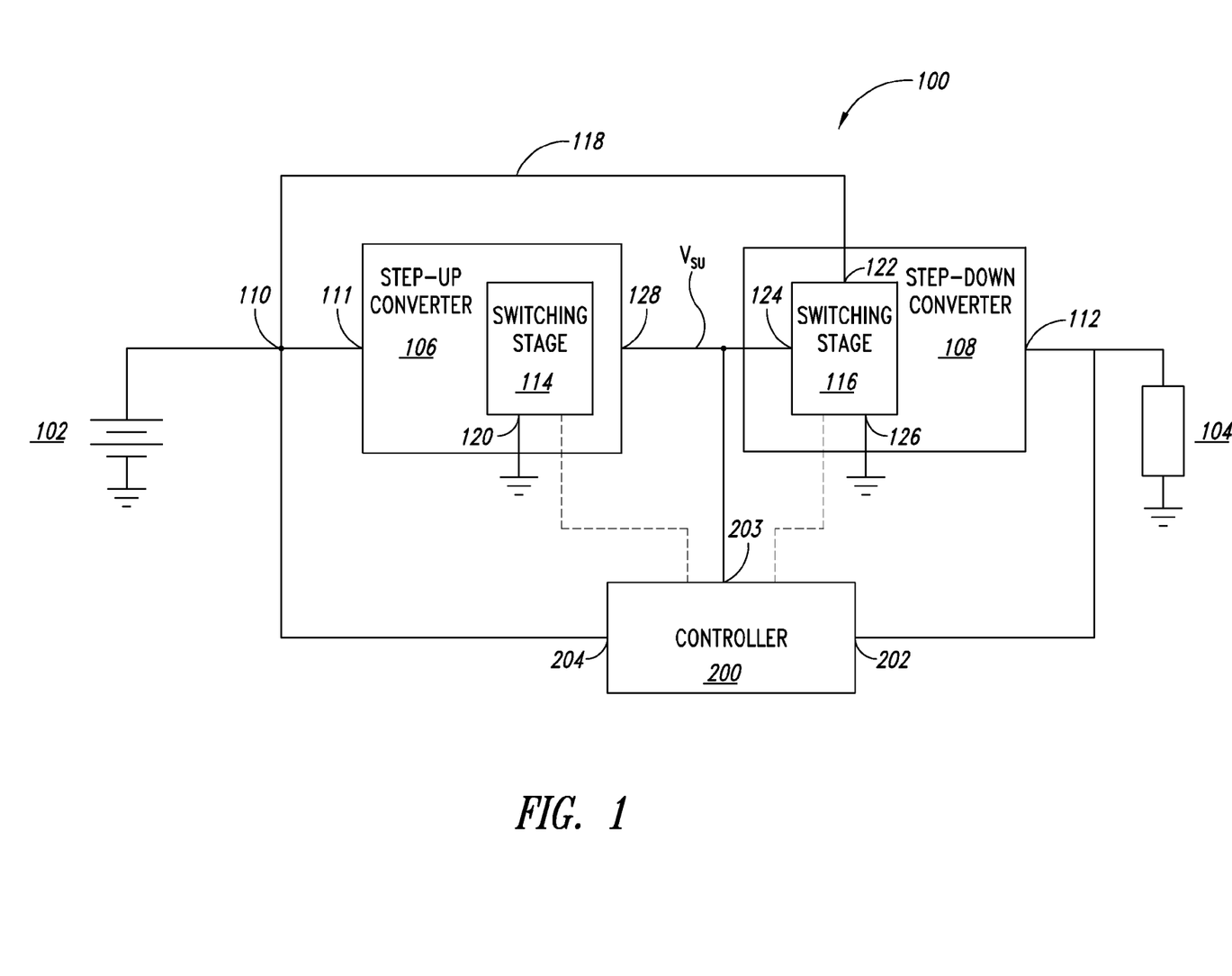
FIG. 1 is a schematic illustration of a power supply circuit according to an embodiment of the disclosure.

Referring to FIG. 1, according to one embodiment of the disclosure there is provided an electrical power supply circuit 100 arranged to deliver power from a power source 102 to a load 104. In this embodiment, the power source 102 is a battery of a mobile communication device, such as a mobile telephone, and the load 104 is an electrical component of the device, such as a radio frequency (RF) power amplifier (PA). The voltage provided by the power source 102 is referred to as source voltage $V_{BAT}$, and the voltage delivered to the load 104 by the electrical power supply circuit 100 is referred to as output voltage $V_{OUT}$. In a Global System for Mobile Communications (GSM) mobile communication device, the battery typically provides the source voltage $V_{BAT}$ at between 2.5V to 4.2V and the RF PA typically uses the output voltage $V_{OUT}$ around 3.4V, although in Multi Mode Multi Band (MMMB), the RF PA can use the output voltage $V_{OUT}$ between 4V and 4.5V.

The electrical power supply circuit 100 comprises a step-up converter 106, a step-down converter 108, and a controller stage 200 that controls the converters 106, 108. The electrical power supply circuit 100 has an input node 110 coupleable to the electrical power source 102. An input 111 of the step-up converter 106 is coupled to the input node 110 and an output 112 of the step-down converter 108 is coupleable to the load 104.

The step-up converter 106 has a step-up converter switching stage 114 and the step-down converter 108 has a step-down converter switching stage 116. The controller 200 is arranged to provide control signals to the step-up converter switching stage 114 and to the step-down converter switching stage 116, and has an input 204 coupled to the input node 110, an input 203 coupled to a connection node between the step-up converter 106 and the step-down-converter 108, and an input 202 coupled to the output node 112. The step-up converter switching stage 114 has an input 120 coupled to ground. A bypass path 118 is provided to couple a first input 122 of the step-down switching stage 116 to the input node 110, which path bypasses the step-up converter 106. A second input 124 of the step-down converter switching stage 116 is coupled to an output 128 of the step-up converter 106 and a third input 126 of the step-down converter switching stage 116 is coupled to ground.

Figure 2:
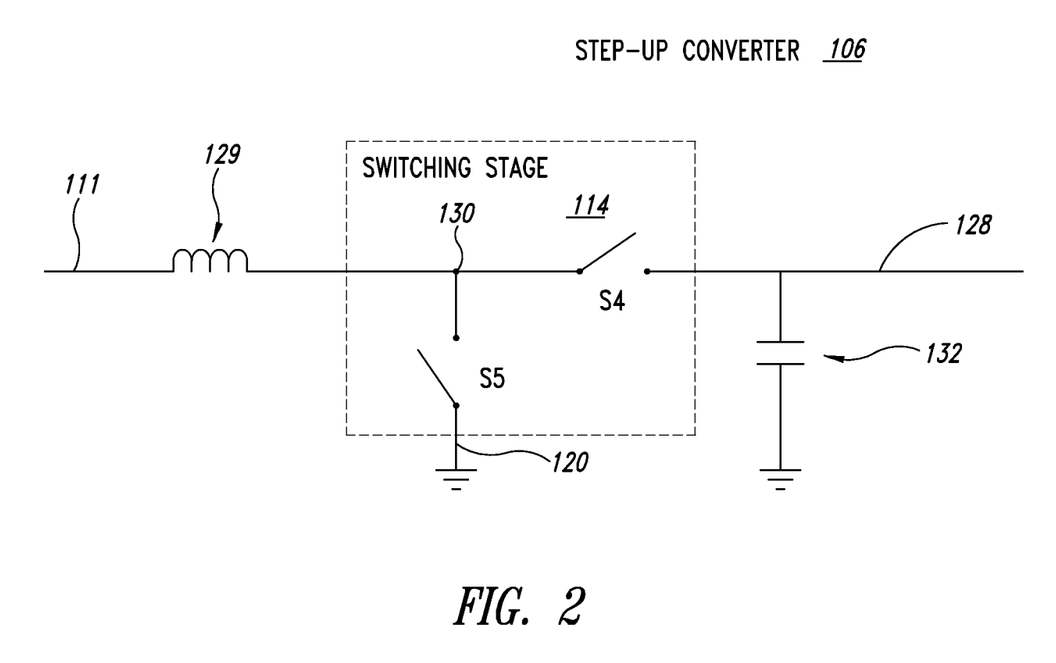
FIG. 2 is a schematic illustration of a step-up converter of the power supply circuit.

Referring to FIG. 2, the step-up converter 106 comprises an inductive element 129 coupled between the input 111 of the step-up converter 106 and a step-up converter node 130, and a capacitive element 132 coupled between the output 128 of the step-up converter 106 and ground. The step-up converter switching stage 114 is arranged to selectively couple the step-up converter node 130 to the output 128 of the step-up converter 106 and to ground. In this embodiment, the step-up converter switching stage 114 comprises a first switch S4 arranged to selectively couple the step-up converter node 130 to the output 128 of the step-up converter 106, and a second switch S5 arranged to selectively couple the step-up converter node 130 to ground. The controller 200 controls the switches S4, S5 so as to provide a higher voltage $V_{SU}$ at the output 128 of the step-up converter 106 than at the input 111 of the step-up converter 106, according to a known manner.

Figure 3:
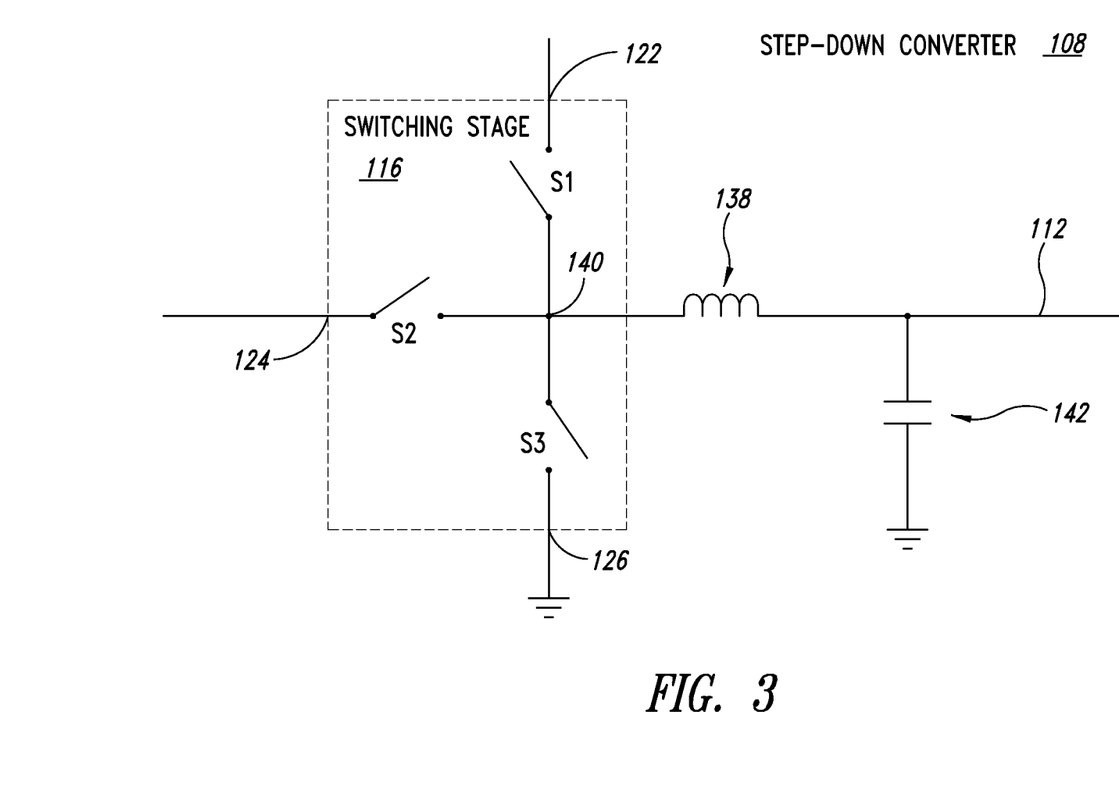
FIG. 3 is a schematic illustration of a step-down converter of the power supply circuit.

Referring to FIG. 3, the step-down converter 108 comprises an inductive element 138 coupled between a step-down converter node 140 and the output 112 of the step-down converter 108, and a capacitive element 142 coupled between the output 112 of the step-down converter 108 and ground. The step-down converter switching stage 116 is arranged to selectively couple the step-down converter node 140 to the input node 110 via the path 118 bypassing the step-up converter 106 (using its first input 122), to the output 128 of the step-up converter 106 (using its second input 124) and to ground (using its third input 126). In this embodiment, the step-down converter switching stage 116 comprises a first switch S1 arranged to selectively couple the step-down converter node 140 to the first input 122 of the step-down converter switching stage 116, a second switch S2 arranged to selectively couple the step-down converter node 140 to the second input 124 of the step-down converter switching stage 116, and third switch S3 arranged to selectively couple the step-down converter node 140 to the third input 126 of the step-down converter switching stage 116.

The first, second, third, fourth and fifth switches S1, S2, S3, S4, S5 are described herein as "closed" when they are in a conducting state, i.e. when they conduct electricity, and as "open" when they are in a non-conducting state, i.e. when they do not conduct electricity. When the first, second, third, fourth and fifth switches S1, S2, S3, S4, S5 are closed they respectively couple the step-down converter node 140 to the first, second and third inputs 122, 124, 126 and the step-up converter node 130 to the output 128 of the step-up converter 108 and to ground. When the first, second, third, fourth and fifth switches S1, S2, S3, S4, S5 are open they respectively decouple the step-down converter node 140 from the first, second and third inputs 122, 124, 126 and the step-up converter node 130 from the output 128 of the step-up converter 108 and from ground.

As mentioned above, the controller 200 of the power supply circuit 100 is configured to control the step-down converter switching stage 116. The controller 200 has a first input 202 coupled to the output 112 of the step-down converter 108, a second input 203 coupled to the input 126 of the step-down converter 108, a third input 204 coupled to the input node 110. The controller 200 is arranged to deliver control signals for the first, second and third switches S1, S2, S3 of the step down converter switching stage 116 at first, second and third outputs 206, 208, 210 of the controller 200 respectively.

Figure 4:
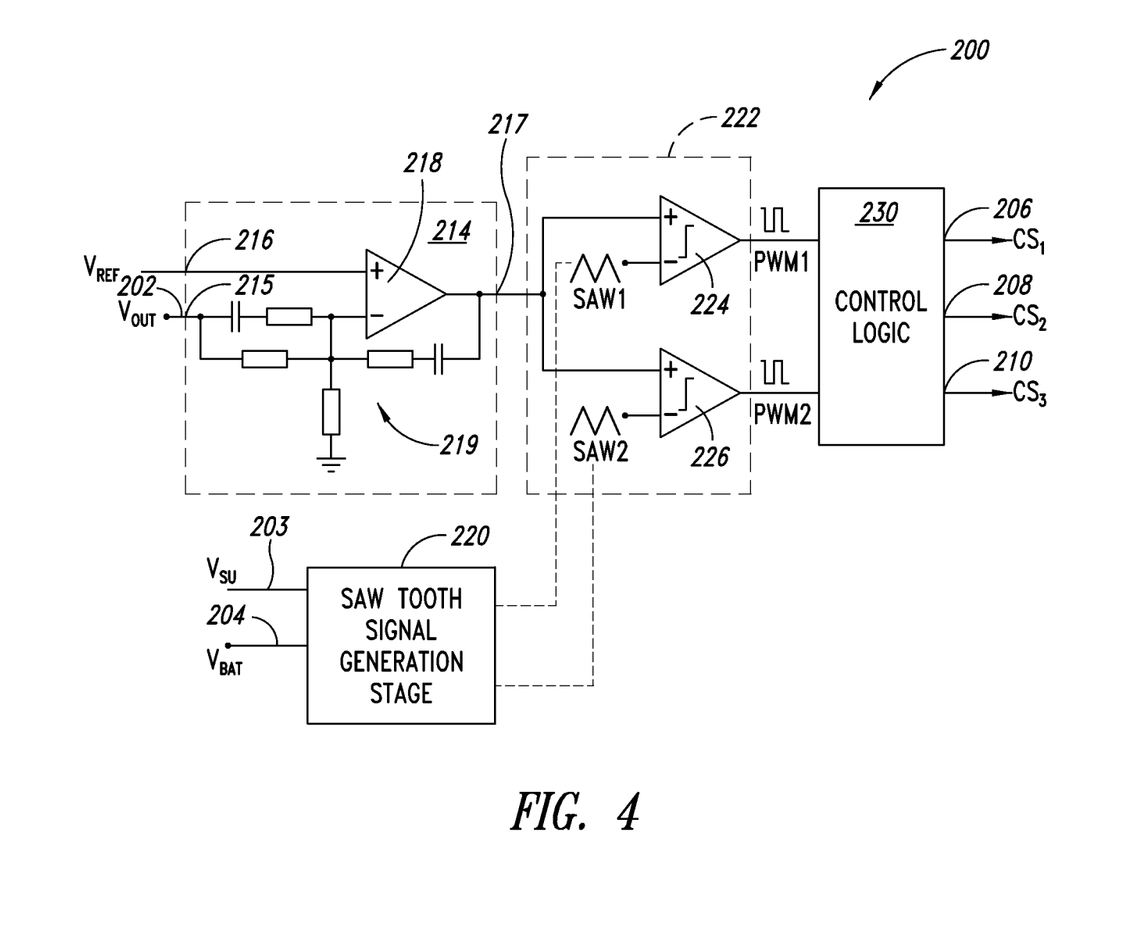
FIG. 4 is a schematic illustration of a controller of the power supply circuit.

Referring to FIG. 4, the controller 200 has an output voltage indication generation stage 214 configured to generate an output voltage indication $V_{ERROR}$. The output voltage indication generation stage 214 has a first input 215 coupled to the first input 202 of the controller 200 to which the output voltage $V_{OUT}$ is delivered, a second input 216 configured to receive a reference voltage $V_{REF}$ which defines a desired output voltage of step-down converter, and an output 217 at which the indication $V_{ERROR}$ is delivered. The output voltage indication generation stage 214 also includes an error amplifier 218 that compares the output voltage $V_{OUT}$ to the reference voltage $V_{REF}$ to generate the indication $V_{ERROR}$ of the output voltage, and an RC network 219 that compensates for a double pole introduced by the step-down coil 138 and the output capacitor 142 and defines the speed of the step-down control loop.

The controller 200 also has a saw tooth signal generation stage 220 configured to generate sawtooth signals SAW1 and SAW2 and comparison stage 222 that includes first and second comparators 224, 226 configured to generate digital signals PWM1 and PWM2, respectively. The comparators 224, 226 each have a first input coupled to the output 217 of the output voltage indication generation stage 214 in order to receive the indication $V_{ERROR}$, a second input coupled to the saw tooth signal generation stage 220 to receive the sawtooth signals SAW1 and SAW2, respectively, and an output configured to supply the digital signals PWM1 and PWM2, respectively, based on a comparison of the indication Verror with sawtooth signals SAW1 and SAW2 (as described below with respect to FIG. 5).

The last stage of the controller 200 is a control logic stage 230 which converts the digital signals PWM1 and PWM2 to three control signals $CS_1$, $CS_2$, $CS_3$ which directly control S1, S2 and S3 switches, respectively.

In order to enhance the system performance, a new control algorithm autonomously selects the right supply input in order to generate the desired output voltage $V_{OUT}$ with maximum efficiency. In one embodiment, the step-up converter 106 is loaded by the step-down converter 108 when the desired output voltage $V_{OUT}$ is close to or higher than the source voltage $V_{BAT}$. The step-up converter 106 provides just a part of the energy used by the step-down converter 108 even if the desired output voltage $V_{OUT}$ is greater than the source voltage $V_{BAT}$. The output voltage $V_{SU}$ of the step-up converter 106 can be tuned to optimize the entire system in terms of technology limitations, source voltage $V_{BAT}$ variation rejection, etc.

Figure 5:
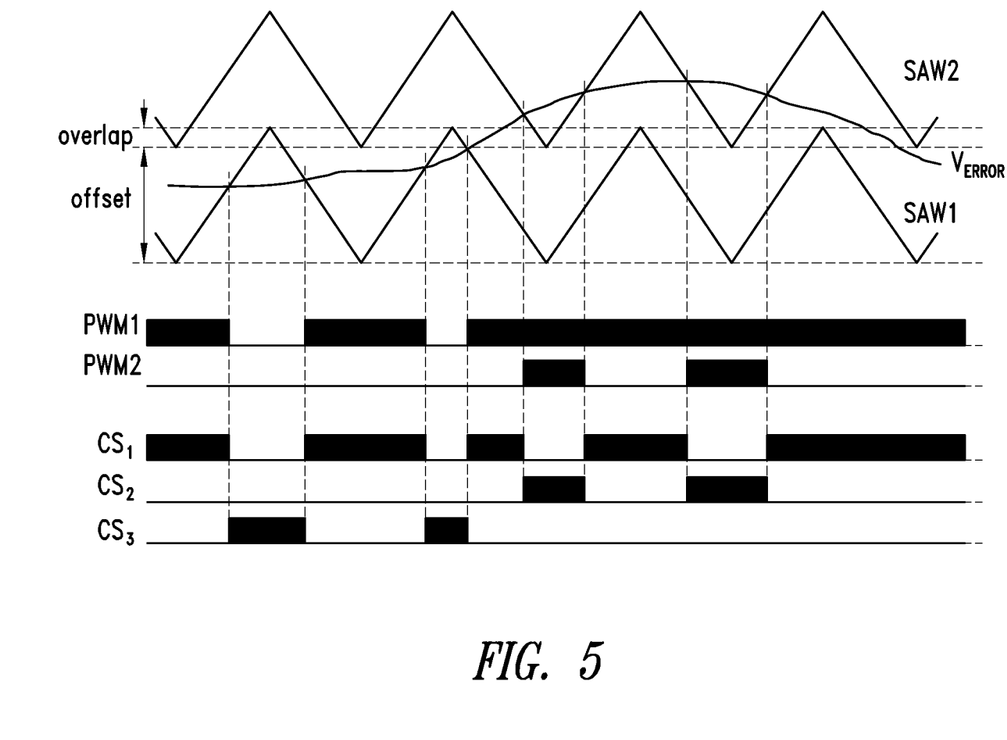
FIG. 5 is a graphical illustration of the signals in the controller.

Referring to FIG. 5, when the indication $V_{ERROR}$ is higher than the level of the first saw tooth signal SAW1, the first pulse width modulated signal PWM1 output by the first comparator 224 is high, and when the indication $V_{ERROR}$ is lower than the level of the first saw tooth signal SAW1, the first pulse width modulated signal PWM1 output by the first comparator 224 is low. When the indication $V_{ERROR}$ is higher than the level of the second saw tooth signal SAW2, the second pulse width modulated signal PWM2 output by the second comparator 226 is high, and when the indication $V_{ERROR}$ is lower than the level of the second saw tooth signal SAW2, the second pulse width modulated signal PWM2 output by the second comparator 226 is low.

When the first pulse width modulated signal PWM1 is high and the second pulse width modulation signal PWM2 is low, the first control signal $CS_1$ output by the combination stage 230 is high and the second and third control signals $CS_2$, $CS_3$ output by the combination stage 230 are low. This causes the first switch S1 of the step-down converter switching stage 116 to be closed, and the second and third switches S2, S3 of the step-down converter switching stage 116 to be open.

When the first pulse width modulated signal PWM1 is low and the second pulse width modulation signal PWM2 is low, the third control signal $CS_3$ output by the combination stage 230 is high and the first and second control signals $CS_1$, $CS_2$ output by the combination stage 230 are low. This causes the third switch S3 of the step-down converter switching stage 116 to be closed, and the first and second switches S1, S2 of the step-down converter switching stage 116 to be open.

When the first pulse width modulated signal PWM1 is high and the second pulse width modulation signal PWM2 is high, the second control signal $CS_2$ output by the combination stage 230 is high and the first and third control signals $CS_1$, $CS_3$ output by the combination stage 230 are low. This causes the second switch S2 of the step-down converter switching stage 116 to be closed, and the first and third switches S1, S3 of the step-down converter switching stage 116 to be open.

A general attribute of the step-down converter 108 is that the output voltage $V_{OUT}$ is equal to the average voltage at the step-down converter node 140. This can be expressed as:

$$V_{OUT} = D_{S1} \cdot V_{BAT} + D_{S2} \cdot V_{SU} + D_{S3} \cdot 0 \quad (1)$$

where $D_{S1}$, $D_{S2}$, $D_{S3}$ are the duty cycles of the first, second and third switches S1, S2, S3 of the step-down converter 108 respectively, and $V_{SU}$ is the voltage at the output 128 of the step-up converter 106. Only one of the first, second and third switches S1, S2, S3 of the step-down converter 108 should be closed at any one time, which results in:

$$D_{S1} + D_{S2} + D_{S3} = 1 \quad (2)$$

In a first mode, the source voltage $V_{BAT}$ is high enough to generate the desired output voltage $V_{OUT}$. In this mode, the controller 200 controls the step-down converter switching stage 116 to alternately close the first and third switches S1, S3 while second switch S2 remains open. This means that the step-up converter 106 has no load and does not use any power. As the second term of equation (1) amounts to zero, the output voltage $V_{OUT}$ can be expressed as:

$$V_{OUT} = D_{S1} \cdot V_{BAT} \quad (3)$$

That means that the output voltage $V_{OUT}$ is proportional to the duty cycle of the first switch S1. The amplitude of the first saw-tooth signal SAW1 is proportional to the source voltage $V_{BAT}$, which can be expressed as:

$$SAW_1 = \alpha \cdot V_{BAT} \quad (4)$$

where the design constant $\alpha$ is less than 1. This technique is known as Feed-Forward compensation to have the loop gain of the step-down converter 108 insensitive to the variation in the source voltage $V_{BAT}$.

The duty cycle of the first switch S1 can be expressed as:

$$D_{S1} = \frac{V_{ERROR}}{SAW_1} \quad (5)$$

As a result, the output voltage $V_{out}$ linearly depends on the error voltage $V_{ERROR}$ as follows:

$$V_{OUT} = \frac{V_{ERROR}}{\alpha} \quad (6)$$

In a second mode, the source voltage $V_{BAT}$ is lower than the desired level of the output voltage $V_{OUT}$, so the assistance of the step-up converter 106 is helpful. A part of the energy for the desired output voltage $V_{OUT}$ is still provided directly by the power source 102 via the bypass path 118 and part of the energy is provided by the step-up converter 106. In this mode, the controller 200 controls the step-down converter switching stage 116 to alternately close the first and second switches S1, S2 while the third switch S3 remains open. Equation (1) can therefore be written as:

$$V_{OUT} = V_{BAT} \cdot D_{S1} + V_{SU} \cdot D_{S2} \quad (7)$$

From equation (2), we know that $$D_{S2} = 1 - D_{S1} \quad (8)$$

which means that equation (7) can be re-written as $$V_{OUT} = V_{BAT} + D_{S2} \cdot (V_{SU} - V_{BAT}) \quad (9)$$

The amplitude of the second saw-tooth signal SAW2 is proportional to the difference between the step-up output voltage $V_{SU}$ and the source voltage $V_{BAT}$, which can be expressed as:

$$SAW_2 = \beta \cdot (V_{SU} - V_{BAT}) \quad (10)$$

where the design constant $\beta$ is less than 1. This Feed-Forward compensation makes the step-down converter 108 insensitive to any variation in the step-up output voltage $V_{SU}$ or the source voltage $V_{BAT}$ and the loop gain is constant.

The duty cycle of the second switch S2 can be expressed as:

$$D_{S2} = \frac{V_{ERROR}}{SAW_2} \quad (11)$$

As a result, the output voltage $V_{out}$ linearly depends on the error voltage $V_{ERROR}$ as follows:

$$V_{OUT} = V_{BAT} + \frac{V_{ERROR}}{\beta} \quad (12)$$

Equations 6 and 12 show that the output voltage $V_{OUT}$ is proportional to the error voltage $V_{ERROR}$ in both operational modes and an identical loop gain is achieved when $\alpha = \beta$. Thanks to the stable loop gain, the step-down converter 108 can be controlled by a single error signal in both operational modes. The generation of the digital signals PWM1, PWM2 become a matter of the correct positioning of both saw-tooth signals SAW1 and SAW2 in order to ensure a smooth transition between the operational modes without significant efficiency degradation.

In theory, the best solution is to put the second saw-tooth signal SAW2 on top of the first saw-tooth signal SAW1. Both operation modes would perfectly follow each other with one common point at which the output voltage $V_{OUT}$ equals the source voltage $V_{BAT}$. That would result in only one of the digital signals PWM1, PWM2 toggling at a time.

This would lead to minimum commutations of the switches S1, S2, S3 during the working period (only two commutations per period).

In a real design, a small overlap of the saw-tooth signals SAW1 and SAW2 helps to ensure smooth transitions between the operation modes due to a finite speed of the circuitry and offsets. The exact overlap value depends on the quality of the circuitry implementation and can be fine-tuned as needed.

Figure 6:
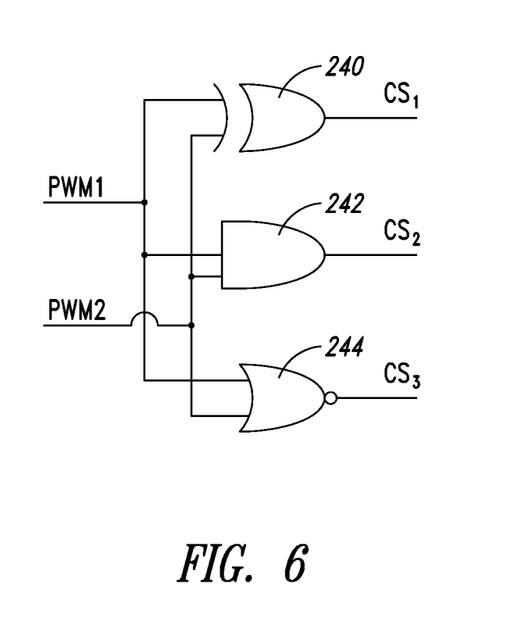
FIG. 6 is a schematic diagram of control logic of the controller.

A schematic of the control logic 230 according to one embodiment is shown in FIG. 6. In FIG. 6, the control logic includes an XOR gate 240, an AND gate 242, and a NOR gate 244 each having a first input coupled to receive the first digital signal PWM1 and a second input coupled to receive the second digital signal PWM2. The XOR gate 240 outputs the first control signal $CS_1$ at a high level when the digital signals PWM1, PWM2 are different and at a low level when the digital signals PWM1, PWM2 are equal. The AND gate 242 outputs the second control signal $CS_2$ at a high level when the digital signals PWM1, PWM2 are logically high and at a low level otherwise. The NOR gate 244 outputs the third control signal $CS_3$ at a high level when the digital signals PWM1, PWM2 are both logically low and at a low level otherwise. This corresponds to the discussion of the operational modes above with respect to FIG. 5. One skilled in the art will recognize that delays may be added to ensure that there is no overlap in the control signals $CS_1$, $CS_2$, $CS_3$.

Other variations and modifications will be apparent to the skilled person. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical power supply circuit for delivering power from a power source to a load, the electrical power supply circuit comprising:
   an power input node coupleable to the power source;
   a step-up converter having an input coupled to the power input node;
   a step-down converter having a step-down converter node and an output coupleable to the load;
   a conductive bypass path;
   a switching stage that includes: a first switch configured to selectively couple the step-down converter node of the step-down converter to the input of the step-up converter via the bypass path that bypasses the step-up converter; a second switch configured to selectively couple an output of the step-up converter to the step-down converter node of the step-down converter; and a third switch configured to selectively couple the step-down converter node of the step-down converter to a ground; and
   a controller configured to:
      in a first mode, open the second switch and, alternatingly:
         close the first switch and open the third switch; and
         open the first switch and close the third switch; and
      in a second mode, open the third switch and, alternatingly:
         close the first switch and open the second switch; and
         open the first switch and close the second switch.

2. The electrical power supply circuit of claim 1, wherein the controller is arranged to employ the first mode and the second mode in dependence on an output voltage at the output of the step-down converter.

3. The electrical power supply circuit of claim 2, wherein the controller is arranged to employ the first mode when the output voltage is less than a first mode threshold and to employ the second mode when the output voltage is greater than a second mode threshold.

4. The electrical supply controller of claim 3, wherein the first mode threshold and the second mode threshold are equal.

5. The electrical supply controller of claim 3, wherein the first mode threshold is greater than the second mode threshold, and wherein the controller is arranged to employ both the first mode and the second mode when the output voltage is both less than the first mode threshold and greater than the second mode threshold.

6. The electrical supply controller of claim 3, wherein the controller is configured to:
   in the second mode, increase a time that second switch electrically couples the step-down converter node to the output of the step-up converter compared to a time that that first switch electrically couples the step-down converter node to the input of the step-up converter via the bypass path as the output voltage increases, and
   in the first mode, increase a time that the third switch electrically couples the step-down converter node to the ground compared to the time that the first switch electrically couples the step-down converter node to the input of the step-up converter via the bypass path as the output voltage decreases.

7. The electrical supply controller of claim 1, wherein the controller has a comparison stage configured to compare an indication of the output voltage with a first saw tooth signal and with a second saw tooth signal, and the controller is configured to:
   in the first mode, either to control the switching stage to electrically couple the step-down converter node to the input of the step-up converter via the bypass path when the indication is greater than the first saw tooth signal and to the ground when the indication is less than the first saw tooth signal, or to control the switching stage to electrically couple the step-down converter node to the input of the step-up converter via the bypass path when the indication is less than the first saw tooth signal and to the ground when the indication is greater than the first saw tooth signal, and
   in the second mode, either to control the switching stage to electrically couple the step-down converter node to the input of the step-up converter via the bypass path when the indication is less than the second saw tooth signal and to the output of the step-up converter when the indication is greater than the second saw tooth signal, or to control the switching stage to electrically couple the step-down converter node to the input of the step-up converter via the bypass path when the indication is less than the second saw tooth signal and to the output of the step-up converter when the indication is greater than the second saw tooth signal.

8. The electrical supply controller of claim 7, wherein the first saw tooth signal and the second saw tooth signal vary with the same frequency, phase and amplitude.

9. The electrical supply controller of claim 8, wherein:
the first saw tooth signal and the second saw tooth signal have a DC offset between them; and
the controller is configured to electrically couple the step-down converter node to the input of the step-up converter via the bypass path whenever the indication is between the first saw tooth signal and the second saw tooth signal.

10. The electrical supply controller of claim 7, wherein the controller is arranged to vary amplitudes of the first and second saw tooth signals proportionally with a voltage of the power source.

11. A method of supplying power from a power source to a load, the method comprising:
in a first mode, electrically coupling a step-down converter node of a step-down converter cyclically to the power source via a conductive bypass path that bypasses a step-up converter, according to a first duty cycle, and electrically coupling the step-down converter node cyclically to ground according to a second duty cycle that does not overlap the first duty cycle, the step-up converter having an input electrically coupled to the power source and the step-down converter having an output electrically coupled to the load; and
in a second mode, electrically coupling the step-down converter node cyclically to the power source via the bypass path, according to a third duty cycle, and electrically coupling the step-down converter node cyclically to an output of the step-up converter according to a fourth duty cycle that does not overlap the third duty cycle.

12. The method of claim 11, wherein the first mode and the second mode are employed in dependence on an output voltage at the output of the step-down converter.

13. The method of claim 12, comprising employing the first mode when the output voltage is less than a first mode threshold and employing the second mode when the output voltage is greater than a second mode threshold.

14. The method of claim 13, wherein the first mode threshold and the second mode threshold are equal.

15. A device, comprising:
a power source; and
an electrical power supply circuit for delivering power from the power source to a load, the electrical power supply circuit including:
an power input node coupleable to the power source;
a step-up converter having an input coupled to the power input node;
a step-down converter having a step-down converter node and an output coupleable to the load;
a conductive bypass path;
a switching stage that includes: a first switch configured to selectively couple the step-down converter node of the step-down converter to the input of the step-up converter via the bypass path that bypasses the step-up converter; a second switch configured to selectively couple an output of the step-up converter to the step-down converter node of the step-down converter; and a third switch configured to selectively couple the step-down converter node of the step-down converter to a ground; and
a controller configured to:
in a first mode, open the second switch and, alternatingly:
close the first switch and open the third switch; and
open the first switch and close the third switch; and
in a second mode, open the third switch and, alternatingly:
close the first switch and open the second switch; and
open the first switch and close the second switch.

16. The device of claim 15, wherein the controller is arranged to employ the first mode and the second mode in dependence on an output voltage at the output of the step-down converter.

17. The device of claim 16, wherein the controller is arranged to employ the first mode when the output voltage is less than a first mode threshold and to employ the second mode when the output voltage is greater than a second mode threshold.

18. The device of claim 17, wherein the first mode threshold and the second mode threshold are equal.

19. The device of claim 17, wherein the first mode threshold is greater than the second mode threshold, and wherein the controller is arranged to employ both the first mode and the second mode when the output voltage is both less than the first mode threshold and greater than the second mode threshold.

20. The device of claim 17, wherein the controller is configured to:
in the second mode, increase a time that second switch electrically couples the step-down converter node to the output of the step-up converter compared to a time that that first switch electrically couples the step-down converter node to the input of the step-up converter via the bypass path as the output voltage increases, and
in the first mode, increase a time that the third switch electrically couples the step-down converter node to the ground compared to the time that the first switch electrically couples the step-down converter node to the input of the step-up converter via the bypass path as the output voltage decreases.

21. The device of claim 15, wherein the controller has a comparison stage configured to compare an indication of the output voltage with a first saw tooth signal and with a second saw tooth signal, and the controller is configured to:
in the first mode, either to control the switching stage to electrically couple the step-down converter node to the input of the step-up converter via the bypass path when the indication is greater than the first saw tooth signal and to the ground when the indication is less than the first saw tooth signal, or to control the switching stage to electrically couple the step-down converter node to the input of the step-up converter via the bypass path when the indication is greater than the first saw tooth signal and to the ground when the indication is less than the first saw tooth signal, and
in the second mode, either to control the switching stage to electrically couple the step-down converter node to the input of the step-up converter via the bypass path when the indication is less than the second saw tooth signal and to the output of the step up converter when the indication is greater than the second saw tooth signal, or to control the switching stage to electrically couple the step-down converter node to the input of the step-up converter via the bypass path when the indication is less than the second saw tooth signal and to the output of the step-up converter when the indication is greater than the second saw tooth signal.

22. The device of claim 21, wherein the first saw tooth signal and the second saw tooth signal vary with the same frequency, phase and amplitude.

23. The device of claim 22, wherein
the first saw tooth signal and the second saw tooth signal have a DC offset between them; and
the controller is configured to electrically couple the step-down converter node to the input of the step-up converter via the bypass path whenever the indication is between the first saw tooth signal and the second saw tooth signal.

24. The device of claim 21, wherein the controller is arranged to vary amplitudes of the first and second saw tooth signals proportionally with a voltage of the power source.

25. An electrical power supply circuit for delivering power from a power source to a load, the electrical power supply circuit comprising:
an power input node coupleable to the power source;
a step-up converter having an input coupled to the power input node;
a step-down converter having a step-down converter node and an output coupleable to the load;
a conductive bypass path;
a switching stage configured to: selectively couple the step-down converter node of the step-down converter to the input of the step-up converter via the bypass path that bypasses the step-up converter; selectively couple an output of the step-up converter to the step-down converter node of the step-down converter; and selectively couple the step-down converter node of the step-down converter to a ground; and
a controller configured to:
in a first mode, cause the switching stages to electrically couple the step-down converter node cyclically to the power source via the bypass path, according to a first duty cycle, and electrically couple the step-down converter node cyclically to ground according to a second duty cycle that does not overlap the first duty cycle; and
in a second mode, cause the switching stages to electrically couple the step-down converter node cyclically to the power source via the bypass path, according to a third duty cycle, and electrically coupling the step-down converter node cyclically to the output of the step-up converter according to a fourth duty cycle that does not overlap the third duty cycle.

26. The electrical power supply circuit of claim 25, wherein the controller is arranged to employ the first mode and the second mode in dependence on an output voltage at the output of the step-down converter.

27. The electrical supply controller of claim 25, wherein the controller has a comparison stage configured to compare an indication of the output voltage with a first saw tooth signal and with a second saw tooth signal, and the controller is configured to:
in the first mode, either to control the switching stage to electrically couple the step-down converter node to the input of the step-up converter via the bypass path when the indication is greater than the first saw tooth signal and to the ground when the indication is less than the first saw tooth signal, or to control the switching stage to electrically couple the step-down converter node to the input of the step-up converter via the bypass path when the indication is less than the first saw tooth signal and to the ground when the indication is greater than the first saw tooth signal, and
in the second mode, either to control the switching stage to electrically couple the step-down converter node to the input of the step-up converter via the bypass path when the indication is less than the second saw tooth signal and to the output of the step-up converter when the indication is greater than the second saw tooth signal, or to control the switching stage to electrically couple the step-down converter node to the input of the step-up converter via the bypass path when the indication is less than the second saw tooth signal and to the output of the step-up converter when the indication is greater than the second saw tooth signal.

28. The electrical supply controller of claim 27, wherein:
the first saw tooth signal and the second saw tooth signal vary with the same frequency, phase and amplitude;
the first saw tooth signal and the second saw tooth signal have a DC offset between them; and
the controller is configured to electrically couple the step-down converter node to the input of the step-up converter via the bypass path whenever the indication is between the first saw tooth signal and the second saw tooth signal.

29. The electrical supply controller of claim 27, wherein the controller is arranged to vary amplitudes of the first and second saw tooth signals proportionally with a voltage of the power source.

* * * * *